(12) United States Patent
Arai (10) Patent No.: US 7,657,174 B2
(45) Date of Patent: Feb. 2, 2010

(54) LENS INTERCHANGEABLE CAMERA WITH PROTECTION COVER

(75) Inventor: Masao Arai, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 322 days.

(21) Appl. No.: 11/822,083

(22) Filed: Jul. 2, 2007

(65) Prior Publication Data

US 2008/0002968 A1    Jan. 3, 2008

(30) Foreign Application Priority Data

Jul. 3, 2006    (JP) ............................. 2006-183315

(51) Int. Cl.
*G03B 17/02* (2006.01)
*G03B 17/00* (2006.01)

(52) U.S. Cl. ...................... 396/535; 396/532; 396/531; 348/211.14; 348/360

(58) Field of Classification Search ................. 396/448, 396/535, 532; 348/211.14
See application file for complete search history.

(56) References Cited

U.S. PATENT DOCUMENTS

| | | | | |
|---|---|---|---|---|
| 2,741,168 A | * | 4/1956 | Schreiber | .................... 396/446 |
| 4,448,509 A | * | 5/1984 | Katsuma et al. | ............. 396/532 |
| 4,728,977 A | * | 3/1988 | Yomogizawa et al. | ........ 396/349 |
| 6,742,943 B2 | * | 6/2004 | Ushiro | ........................ 396/529 |
| 2005/0212949 A1 | * | 9/2005 | Tokiwa et al. | ............... 348/340 |
| 2008/0292306 A1 | * | 11/2008 | Watanabe et al. | ........... 396/448 |

FOREIGN PATENT DOCUMENTS

| | | | |
|---|---|---|---|
| JP | 6-167670 A | | 6/1994 |
| JP | 2000241869 A | * | 9/2000 |

* cited by examiner

*Primary Examiner*—W. B. Perkey
*Assistant Examiner*—Bret Adams
(74) *Attorney, Agent, or Firm*—Birch, Stewart, Kolasch & Birch, LLP (57) ABSTRACT

A digital still camera includes a camera body. A lens unit is retained on the camera body in a removable manner. A protection cover is secured to the camera body, and movable between a closed position and an open position, wherein the protection cover, when in the closed position, closes an exposure opening formed in the camera body, and when in the open position, opens the exposure opening. Cover moving transmission levers set the protection cover in the open position when the lens unit is retained on the camera body, and set the protection cover in the closed position when the lens unit is removed from the camera body. Furthermore, bayonet claw portions engage the lens unit with the camera body. The transmission levers are actuated in response to movement of the bayonet claw portions. A compression coil spring biases the protection cover toward the closed position.

13 Claims, 8 Drawing Sheets

LENS INTERCHANGEABLE CAMERA WITH PROTECTION COVER

BACKGROUND OF THE INVENTION

1. Field of the Invention

The present invention relates to a lens interchangeable camera. More particularly, the present invention relates to a lens interchangeable camera having a camera body and a lens unit for mounting on the camera body, and capable of preventing entry of dust or other wanted material even at the time of exchange.

2. Description Related to the Prior Art

A digital still camera is widely used, and includes an image pickup device or CCD image sensor for photographing an image. A lens interchangeable type of camera includes a camera body and a lens unit secured to the camera body in a removable manner. A mount mechanism is disposed in the camera body for connection with the lens unit. An exposure opening is formed in the center of the mount mechanism for entry of object light from the lens unit into the camera body. When the lens unit is removed from the camera body for exchange, inner elements of the camera body appear through the exposure opening. If dust enters the exposure opening and deposits on a sensor surface of the image pickup device in the camera body, image quality of recorded images will be lowered. A user must handle the lens unit carefully and exchange the lens unit rapidly by considering JP-A 6-167670 discloses a camera having a photographing optical system movable between a front position and a rear position. When a protection cover for protection from dust is moved to the closed position, the photographing optical system is moved to the rear position. When the protection cover is moved to the open position, the photographing optical system is moved to the front position. The protection cover in the closed position is used for preventing deposition of dust by covering the photographing optical system.

However, environment of various conditions is possible in exchange of the lens unit, for example an outdoor condition, a dirty condition with much dust even in an indoor state. Dust or other unwanted material may enter the camera body through the exposure opening in the exchange no matter how quickly a user handles the lens unit. A camera in JP-A 6-167670 is a type different from a lens interchangeable type. Although dust is prevented from depositing on the photographing optical system in the document, there is no prevention of entry of dust in the camera body.

SUMMARY OF THE INVENTION

In view of the foregoing problems, an object of the present invention is to provide a lens interchangeable camera having a camera body and a lens unit for mounting on the camera body, and capable of preventing entry of dust or other wanted material even at the time of exchange.

In order to achieve the above and other objects and advantages of this invention, a lens interchangeable camera includes a camera body. A lens unit is retained on the camera body in a removable manner. A protection cover is secured to the camera body, and movable between a closed position and an open position, wherein the protection cover, when in the closed position, closes an exposure opening formed for entry of object light from the lens unit into the camera body, and when in the open position, opens the exposure opening. A cover moving mechanism sets the protection cover in the open position when the lens unit is retained on the camera body, and sets the protection cover in the closed position when the lens unit is removed from the camera body.

Furthermore, a retaining mechanism engages the lens unit with the camera body. The cover moving mechanism includes a transmission member, actuated in response to movement of the retaining mechanism, for moving the protection cover to the open position.

Furthermore, a support mechanism supports the protection cover movably between the closed and open positions. A biasing mechanism biases the protection cover toward the closed position.

The retaining mechanism includes a bayonet channel formed in the camera body. A bayonet claw portion is disposed to project from the lens unit, for engagement with the bayonet channel. The transmission member includes first and second lever ends, the first lever end is secured to the protection cover, and the second lever end is pressed by the bayonet claw portion.

The bayonet claw portion is constituted by at least first and second bayonet claw portions disposed in a rotationally symmetric manner with one another. The protection cover is constituted by at least first and second protection cover panels. The first protection cover panel is associated with the first bayonet claw portion and moves in a predetermined direction. The second protection cover panel is associated with the second bayonet claw portion, is disposed adjacent to the first protection cover panel, and moves in reverse to the predetermined direction, to define a space in cooperation with the first protection cover panel.

In one preferred embodiment, a lens detecting sensor detects retention of the lens unit on the camera body. The cover moving mechanism is actuated according to a detection result of the lens detecting sensor, sets the protection cover in the open position when the retention is detected, and sets the protection cover in the closed position in case of lack of detected retention.

Furthermore, a selection switch is shiftable selectively in a manual mode position and an automatic mode position. The selection switch, when set in the manual mode position, causes the cover moving mechanism to set the protection cover in either of the closed and open positions irrespective of the detection result of the lens detecting sensor, and when in the automatic mode position, operates the cover moving mechanism according to the detection result of the lens detecting sensor.

The manual mode position is constituted by first and second positions, and the selection switch, when in the first position, sets the protection cover in the closed position, and when in the second position, sets the protection cover in the open position.

The cover moving mechanism further includes an endless belt having the protection cover secured thereto. There are first and second pulleys which the endless belt is engaged with to extend between. A motor rotates the first pulley to move the protection cover by turning about the endless belt.

The protection cover is constituted by first and second protection cover panels disposed adjacent to one another. The endless belt includes a first belt portion, disposed to extend between the first and second pulleys, for sliding the first protection cover panel in a predetermined direction. A second belt portion is disposed to extend along the first belt portion to extend, for sliding the second protection cover panel in reverse to the predetermined direction.

The cover moving mechanism further includes at least one transmission gear for transmitting rotation of the motor to the first pulley. The endless belt is a timing belt, and the first and second pulleys are timing pulleys.

Furthermore, a second endless belt is disposed opposite to the endless belt with reference to the exposure opening, for supporting ends of the first and second protection cover panels movably. There are third and fourth pulleys which the second endless belt is engaged with to extend between.

Furthermore, a bayonet type of retaining mechanism engages the lens unit with the camera body.

In one aspect of the invention, a lens interchangeable camera comprising a camera body. A lens unit is retained on the camera body in a removable manner. A transparent protection cover is secured to the camera body, for closing an exposure opening formed for entry of object light from the lens unit into the camera body.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
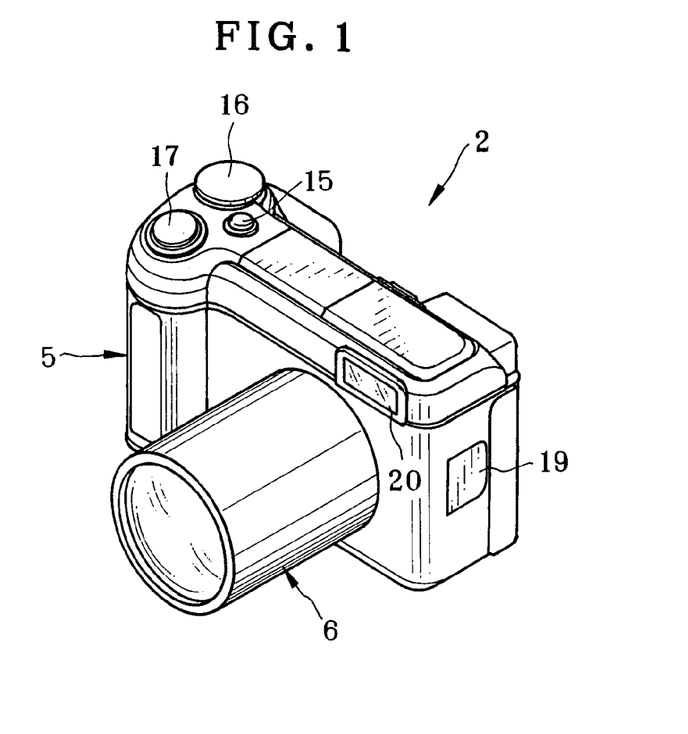
FIG. 1 is a perspective view illustrating a digital still camera.
Figure 2:
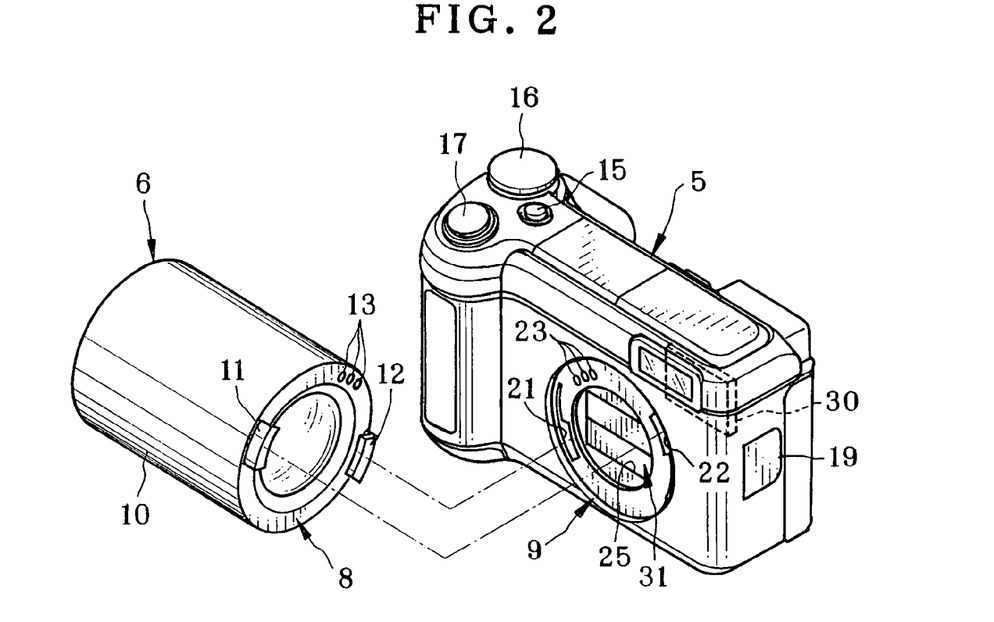
FIG. 2 is a perspective view illustrating a disassembled state of the digital still camera with a lens unit.

In FIGS. 1 and 2, a digital still camera 2 is illustrated as a lens interchangeable camera. The digital still camera 2 includes a camera body 5, and a lens unit 6 or lens assembly as lens barrel fitted on the camera body 5 in a removable manner. In FIG. 2, a bayonet mount 8 as bayonet type of retaining mechanism is disposed at a rear end of the lens unit 6. A mount mechanism 9 as bayonet type of retaining mechanism is disposed on a front side of the camera body 5, and receives engagement of the bayonet mount 8. For the engagement of the mount, at first the lens unit 6 is moved in the optical axis direction to couple the bayonet mount 8 with the mount mechanism 9. Then the lens unit 6 is rotated in one direction at a given angle, for tight fitting. In the embodiment, a bayonet mount including plural bayonet claw portions is used. Furthermore, a mount in the invention may be a screw mount well known in the art. Note that the lens unit 6 is one of plural lens units prepared with different values of focal lengths. In FIG. 1, the lens unit 6 stands fitted on the camera body 5. In FIG. 2, the lens unit 6 is away from the camera body 5.

A lens barrel 10 of the lens unit contains a photographing optical system including a plurality of lenses/lens groups. A cam mechanism, helicoid mechanism and the like are incorporated in the lens barrel 10. When a command signal is output by the camera body 5, a focus lens/lens group in the optical system is moved in the optical axis direction to adjust the focus. Also, the bayonet mount 8 includes bayonet claw portions 11 and 12 or bayonet lugs, and electrical contacts 13 at the rear end of the lens unit 6. Note that the numbers of the bayonet claw portions 11 and 12 and the electrical contacts 13 may be changed suitably for the purpose.

The camera body 5 is in a box form with a small thickness, namely in a shape of a quadrilateral prism, or in a form of a pentaprism type or a shape of SLR type known in the art. An upper side of the camera body 5 is provided with a power button 15, a selection wheel 16 for image pickup modes, and a shutter release button 17. A memory card slot is formed in a lateral face of the camera body 5. A card slot lid 19 is fitted to close the card slot. A rear side of the camera body 5 is provided with an LCD display panel, a zoom button, a cross-shaped button, an eyepiece and the like.

Figure 3:
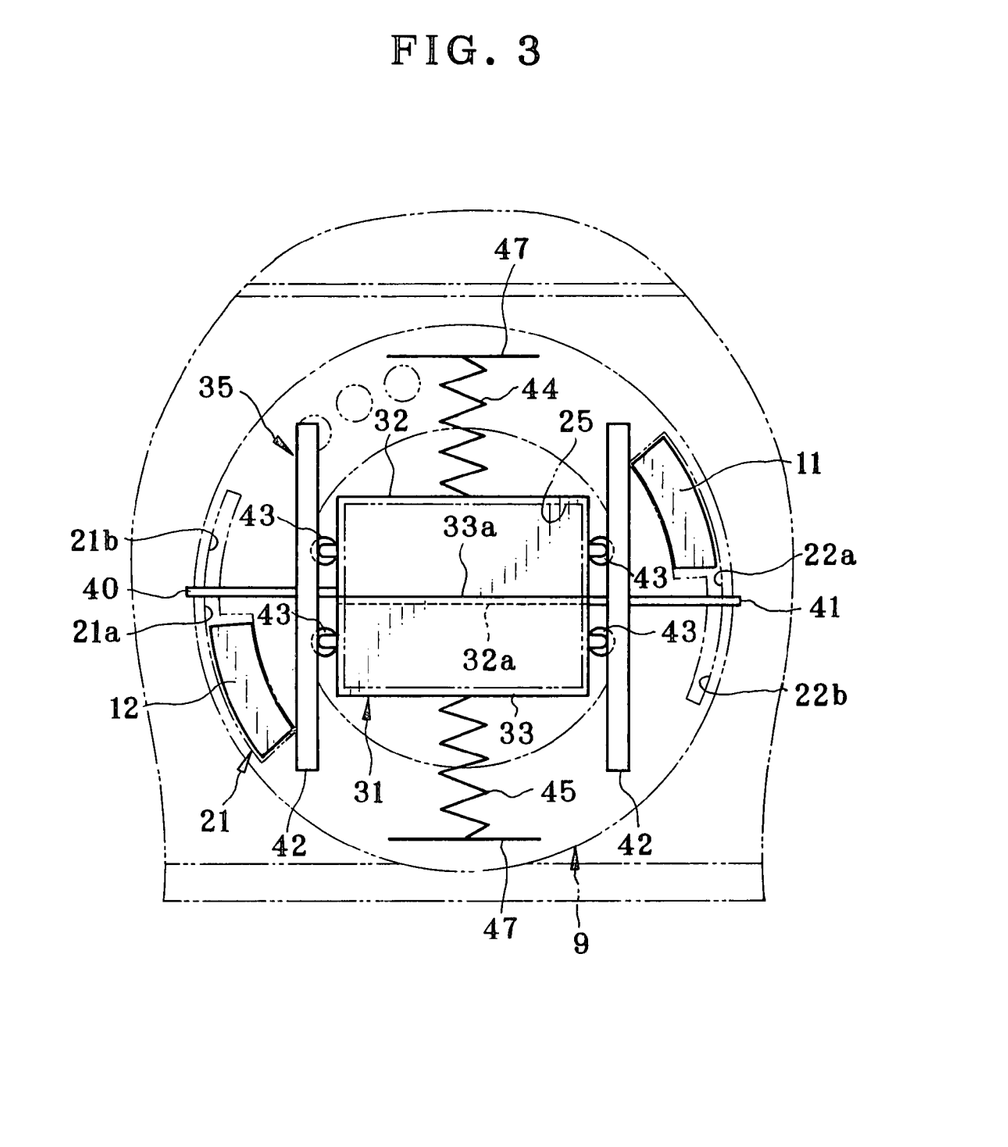
FIG. 3 is a front elevation illustrating a closed state of a protection cover.

In FIG. 2, the front of the camera body 5 has the mount mechanism 9 for engagement with the lens unit 6. Also, a flash light source 20 is disposed in the front of the camera body 5. The mount mechanism 9 has bayonet channels 21 and 22, electrical contacts 23, an exposure opening 25, and a protection cover 31 for closing the opening. The bayonet channel 21 is positioned in the mount mechanism 9 to receive the bayonet claw portion 11. In FIG. 3, the bayonet channel 21 includes an insertion opening 21a and a retaining slot 21b. The insertion opening 21a receives insertion of the bayonet claw portion 11. The retaining slot 21b receives the bayonet claw portion 11 upon its rotation in the clockwise direction at a predetermined angle for firm retention. Similarly, the bayonet channel 22 includes an insertion opening 22a and a retaining slot 22b.

Figure 4:
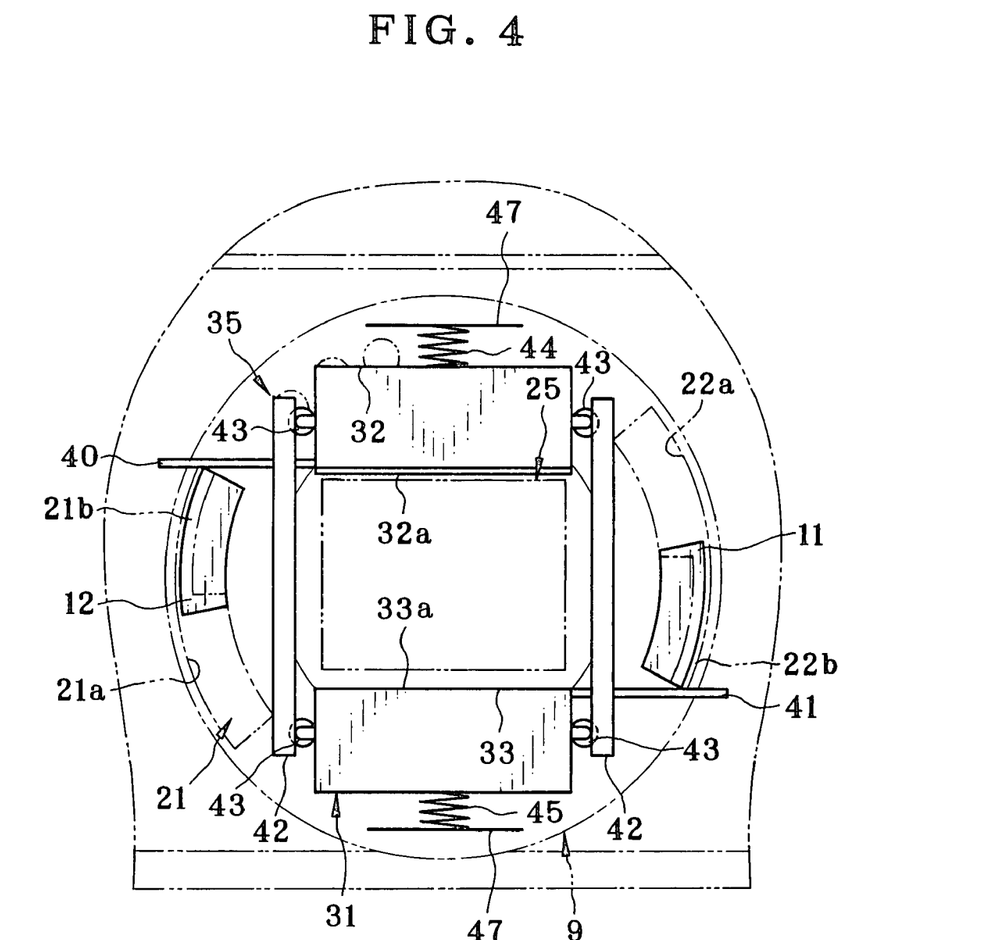
FIG. 4 is a front elevation illustrating an open state of the protection cover.

When the lens unit 6 is rotated, the bayonet claw portions 11 and 12 are rotationally shifted from the insertion position of FIG. 3 to the lock position of FIG. 4. The lens unit 6 becomes secured to the camera body 5. Then the electrical contacts 23 touch the electrical contacts 13 of the bayonet mount 8, to connect the lens unit 6 with the camera body 5 electrically.

The exposure opening 25 has a quadrilateral shape in the center of the mount mechanism 9, and causes object light from the lens unit 6 to pass toward the inside of the camera body 5. In FIG. 2, an image pickup device or CCD image sensor 30 is disposed behind the exposure opening 25 inside the camera body 5. The protection cover 31 in the camera body 5 is movable between a closed position to close the exposure opening 25 and an open position away from the exposure opening 25. In FIGS. 3 and 4, a cover moving mechanism 35 moves the protection cover 31 to the closed and open positions. Note that the exposure opening 25 may have a shape different from the quadrilateral shape, for example circular shape.

In FIG. 3, the protection cover 31 is constituted by an upper protection cover panel 32 and a lower protection cover panel 33. A lower surface 32a of the upper protection cover panel 32 is a convex surface. An upper surface 33a of the lower protection cover panel 33 is a concave surface. The protection cover 31 is movable between a closed position and an open position, and when in the closed position of FIG. 3, closes the exposure opening 25 with the front of the protection cover panels 32 and 33 on the inner side of the camera body 5. The lower surface 32a of the upper protection cover panel 32 is received in the upper surface 33a of the lower protection cover panel 33 according to the corresponding shapes when in the closed position. The protection cover 31, when in the open position of FIG. 4, opens the exposure opening 25 by the upward shift of the upper protection cover panel 32 and the downward shift of the lower protection cover panel 33 away from the exposure opening 25.

In FIGS. 3 and 4, the cover moving mechanism 35 includes transmission levers or rods 40 and 41 having two lever ends, support plates 42 for guide, guide rollers 43 and compression coil springs 44 and 45. The transmission lever 40 is connected with the upper protection cover panel 32. The transmission lever 41 is connected with the lower protection cover panel 33. A first end of the transmission lever 40 is fixed to a side of the upper protection cover panel 32. A second end of the transmission lever 40 is positioned on the rear of the bayonet channel 21. A first end of the transmission lever 41 is fixed to a side of the lower protection cover panel 33. A second end of the transmission lever 41 is positioned on the rear of the bayonet channel 22. When the bayonet claw portions 11 and 12 are inserted in respectively the insertion openings 21a and 22a, the lens unit 6 is rotated in the clockwise direction at a predetermined angle. Then an end of the bayonet claw portions 11 and 12 contacts the transmission levers 40 and 41.

The support plates 42 guide movement of the protection cover panels 32 and 33 in the vertical direction. The support plates 42 are so disposed that the protection cover panels 32 and 33 are located between those, and extend parallel with one another to keep the protection cover panels 32 and 33 movable exactly in the opposite directions. Guide channels (not shown) are formed in the support plates 42 to extend in their longitudinal direction. The guide rollers 43 are set in the guide channel, and keep the protection cover panels 32 and 33 movable vertically. The guide rollers 43 keep those positioned in the optical axis direction without a shift.

A camera chassis or frame 47 is included in the camera body 5, and is provided with one end of the compression coil spring 44 secured thereto. A second end of the compression coil spring 44 is secured to an upper surface of the upper protection cover panel 32. A first end of the compression coil spring 45 is secured to the camera chassis 47. A second end of the compression coil spring 45 is secured to the lower protection cover panel 33. Thus, the compression coil spring 44 biases the upper protection cover panel 32 in the downward direction. The compression coil spring 45 biases the lower protection cover panel 33 in the upward direction. While the lens unit 6 does not lie on the camera body 5, the protection cover 31 is kept by the compression coil springs 44 and 45 in the closed position of FIG. 3 to close the exposure opening 25.

The operation of the embodiment is described now. In FIG. 2, the lens unit 6 is separate from the camera body 5. The protection cover 31 is in the closed position and closes the exposure opening 25. See FIG. 3. To fit the lens unit 6 on the camera body 5, at first the bayonet claw portions 11 and 12 or bayonet lugs are inserted in the insertion openings 21a and 22a, before the lens unit 6 is rotated in the clockwise direction as viewed in the front elevation. Thus, the bayonet claw portions 11 and 12 are rotationally shifted from the insertion position to the lock position. At the same time, end faces of the bayonet claw portions 11 and 12 contact the transmission levers 40 and 41. During application of the rotational force to the transmission levers 40 and 41, the support plates 42 cause the protection cover panels 32 and 33 vertically to move straight. When the bayonet claw portions 11 and 12 rotate to the lock position, the protection cover panels 32 and 33 shift to the open position of FIG. 4 against the bias of the compression coil springs 44 and 45. Object light from a photographing optical system becomes incident upon a sensor surface of the image pickup device or CCD image sensor 30 in the camera body 5.

Handling of the camera body 5 is very easy, as the protection cover 31 is shifted from the closed position to the open position upon securing of the lens unit 6. Also, the exposure opening 25 is kept open while the lens unit 6 is fitted on the camera body 5. No accidental closing occurs, because the protection cover 31 is prevented from setting in the closed position.

The removal of the lens unit 6 from the camera body 5 is referred to. The lens unit 6 is rotated counterclockwise as viewed in the front. At first, the transmission levers 40 and 41 are caused by the bias of the compression coil springs 44 and 45 to press the end surfaces of the bayonet claw portions 11 and 12. The upper protection cover panel 32 moves down while the lower protection cover panel 33 moves up. The bayonet claw portions 11 and 12 rotate from the lock position to the insertion position, to shift the protection cover 31 from the open position to the closed position. Thus, the exposure opening 25 becomes closed by the protection cover panels 32 and 33 in a light tight manner, as the lower surface 32a is combined or engaged with the upper surface 33a to shield light.

Therefore, dust can be prevented from entry into the camera body 5 during exchange of the lens unit 6, because the protection cover 31 closes the exposure opening 25 upon removal of the lens unit 6. Also, the lower surface 32a of the upper protection cover panel 32 and the upper surface 33a of the lower protection cover panel 33 have concave and convex forms, or patterned forms of recesses and projections. When the protection cover 31 is in the closed position, the concave surface or recesses are engaged with the convex surface or projections, to prevent entry of dust between the protection cover panels 32 and 33. The guide rollers 43 of the protection cover panels 32 and 33 are set inside a guide channel. The protection cover 31 can continue to close the exposure opening 25 tightly without a gap even when pressure is applied to the protection cover 31 from the side of the lens unit 6.

Figure 5:
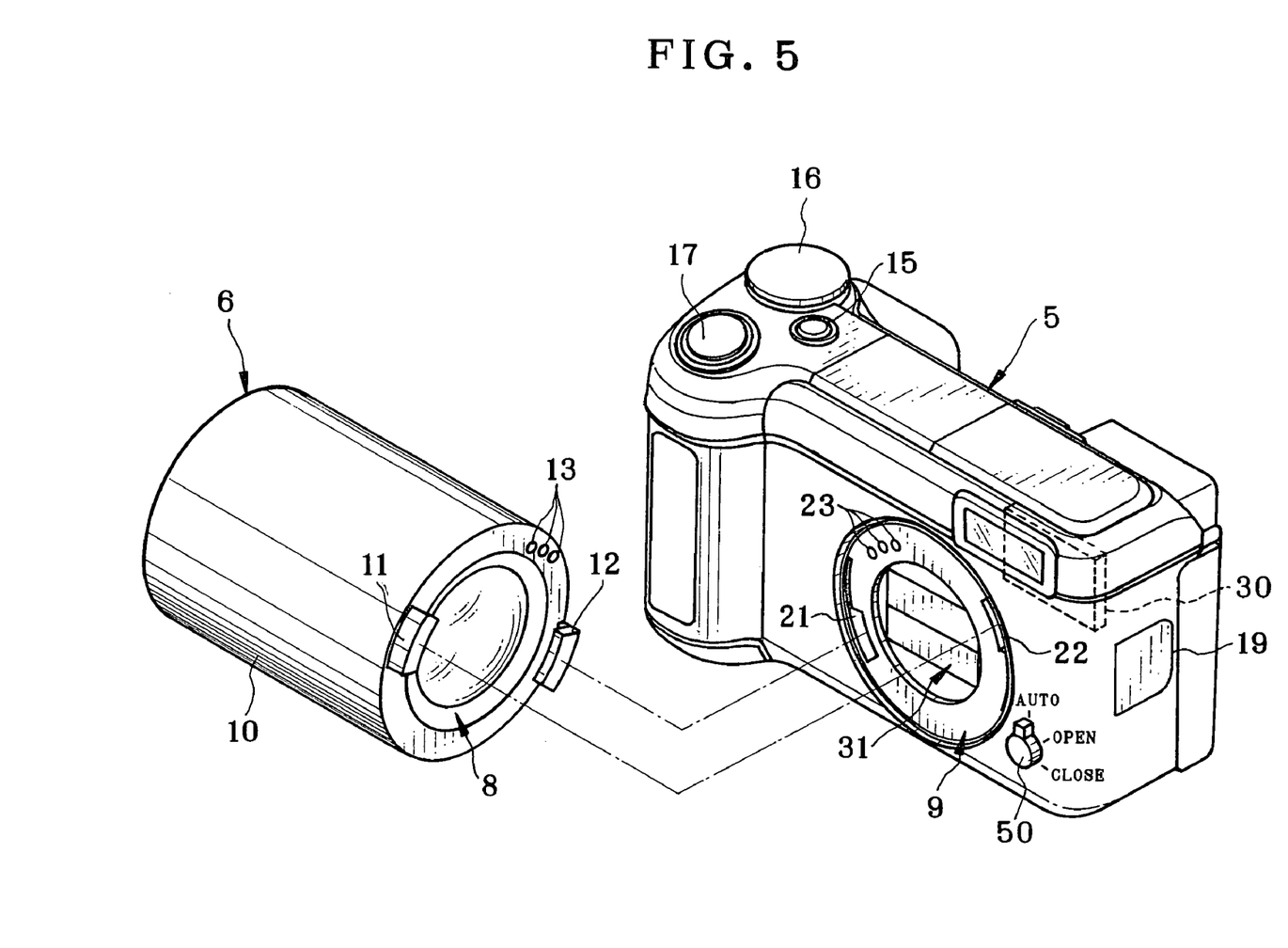
FIG. 5 is a perspective view illustrating one preferred digital still camera having a lens detecting sensor.
Figure 6:
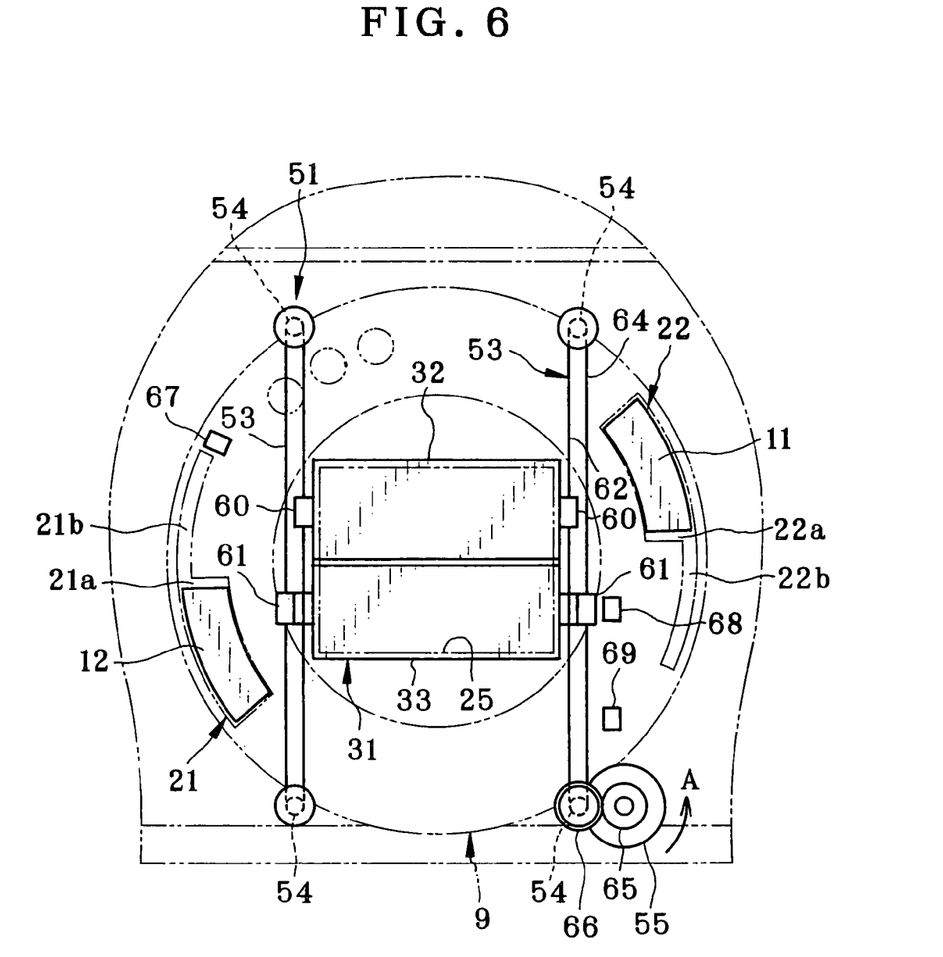
FIG. 6 is a front elevation illustrating a closed state of the protection cover.
Figure 7:
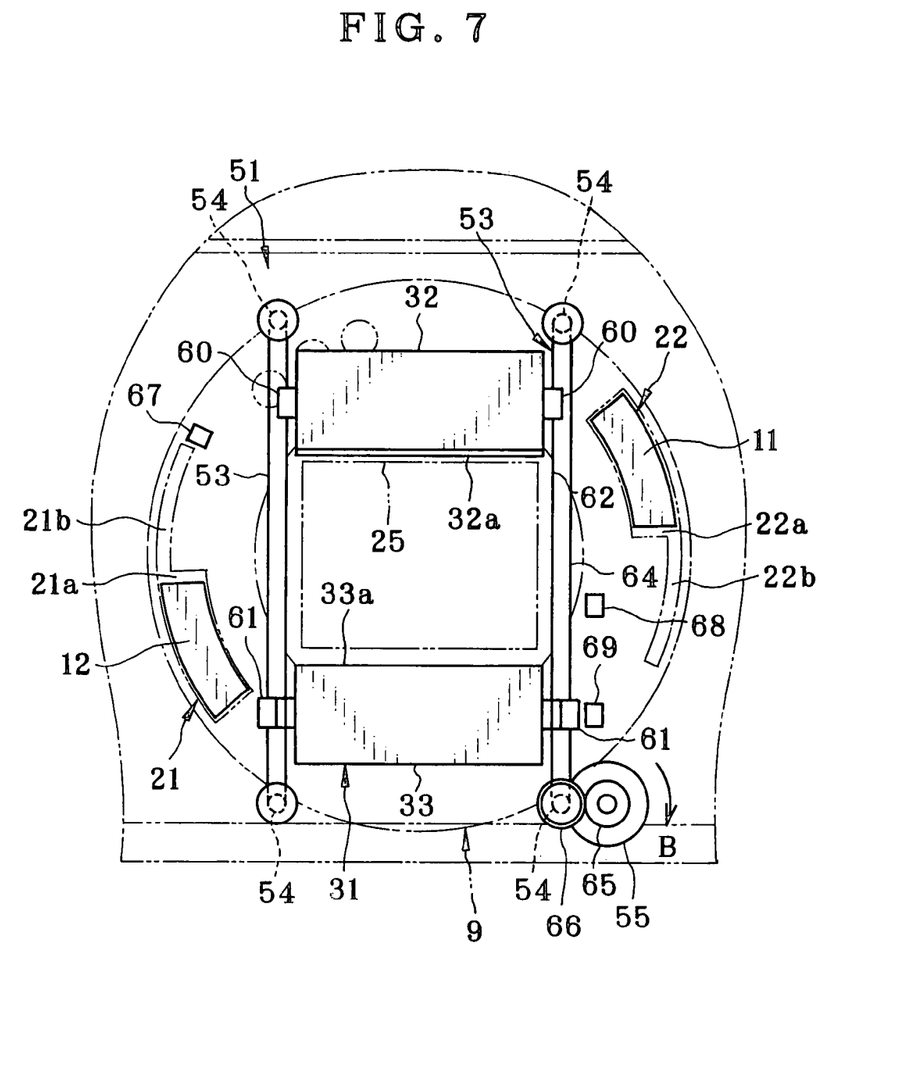
FIG. 7 is a front elevation illustrating an open state of the protection cover.

The cover moving mechanism 35 of the above embodiment mechanically shifts the protection cover 31. In FIGS. 5-7, another preferred embodiment having a sensor for the lens unit 6 is illustrated. Elements similar to the above embodiments are designated with identical reference numerals.

In FIG. 5, a selection switch 50 is disposed on the front of the camera body 5, and sets a selected one of an automatic mode and a manual mode. In the automatic mode, the protection cover 31 can shift to the open position only after detection of mounting of the lens unit 6. In the manual mode, priority is given to preference of a user, to set the protection cover 31 in a selected one of the open and closed positions according to a manual input of the user. The automatic mode is described hereinafter with reference to FIG. 5 according to a setting of the selection switch 50.

In FIG. 6, a cover moving mechanism 51 is disposed behind the mount mechanism 9 to shift the protection cover 31 between the closed and open positions. The cover moving mechanism 51 includes an endless belts or timing belts 53 with teeth, timing pulleys 54 with teeth, and a motor 55.

The timing pulleys 54 are disposed near to upper and lower ends of the protection cover panels 32 and 33. A first one of the timing pulleys 54 is disposed on the upside. A second one of the timing pulleys 54 is disposed on the downside. Each of the endless belts or timing belts 53 extends from the first to the second of the timing pulleys 54 in a turnable manner. An example of the material for the timing belt 53 is rubber, elastomer or other elastic compounds. Teeth of the timing belt 53 are arranged regularly, and are meshed with teeth of the timing pulleys 54. Flanges are formed with the timing pulleys 54, are indicated in the solid line in the drawing, and keep the timing belt 53 in mesh with the timing pulleys 54 without a drop.

A fastener 60 with a screw or the like is provided on each of two sides of the upper protection cover panel 32. A fastener 61 is provided on each of two sides of the lower protection cover panel 33. The fastener 60 is in a quadrilateral shape, and attaches the upper protection cover panel 32 to a first belt portion 62 of the endless belt or timing belt 53 nearer to the protection cover 31. The fastener 61 is in an L shape, and attaches the lower protection cover panel 33 to a second belt portion 64 of the timing belt 53 farther from the protection cover 31. The fastener 61 has a shape not contacting the first belt portion 62 of the timing belt 53. Note that the shapes of the fasteners 60 and 61 are not limited. Examples of fastening of the fasteners 60 and 61 to the timing belt 53 are retention with a screw, adhesive agent and other known methods.

The motor 55 is contained in a lower portion of the camera body 5. A motor gear 65 is connected with an output shaft of the motor 55. A transmission gear 66 is meshed with the motor gear 65. One of the timing pulleys 54 is concentrically positioned on the transmission gear 66. When the motor 55 is energized, the endless belt or timing belt 53 is driven to turn about by the motor gear 65, the transmission gear 66 and the timing pulleys 54 in cooperation. As the fasteners 60 and 61 are connected with the timing belt 53, the motor 55 rotates in the direction of the arrow A in FIG. 6 to move up the upper protection cover panel 32 and move down the lower protection cover panel 33. Also, the motor 55 rotates in the direction of the arrow B in FIG. 7 to move down the upper protection cover panel 32 and move up the lower protection cover panel 33. An L-shaped guide (not shown) is disposed in a moving region of the protection cover panels 32 and 33 for contacting their side surface and rear surface. The guide regulates movement of the protection cover panels 32 and 33 in relation to the horizontal directions and optical axis direction. When the protection cover 31 is set in the closed position, the exposure opening 25 is closed by the front portions of the protection cover panels 32 and 33.

A lens detecting sensor 67 is disposed on the camera body 5 for detecting presence of the lens unit 6. Examples of the lens detecting sensor 67 include a limit switch of a small type, a proximity sensor and the like. The lens detecting sensor 67 detects the bayonet claw portion 12 in the lock position.

A closed position detector or sensor 68 and an open position detector or sensor 69 are incorporated in the camera body 5. Examples of those include a limit switch of a small type, a proximity sensor and the like in a manner similar to the lens detecting sensor 67. When the closed position detector 68 detects the fastener 61 on the lower protection cover panel 33, the protection cover 31 is found set in the closed position. When the open position detector 69 detects the fastener 61, the protection cover 31 is found set in the open position. Note that a target portion detectable by the closed position detector 68 and the open position detector 69 may be positioned in a manner distinct from the fastener 61 of the embodiment.

Figure 8:
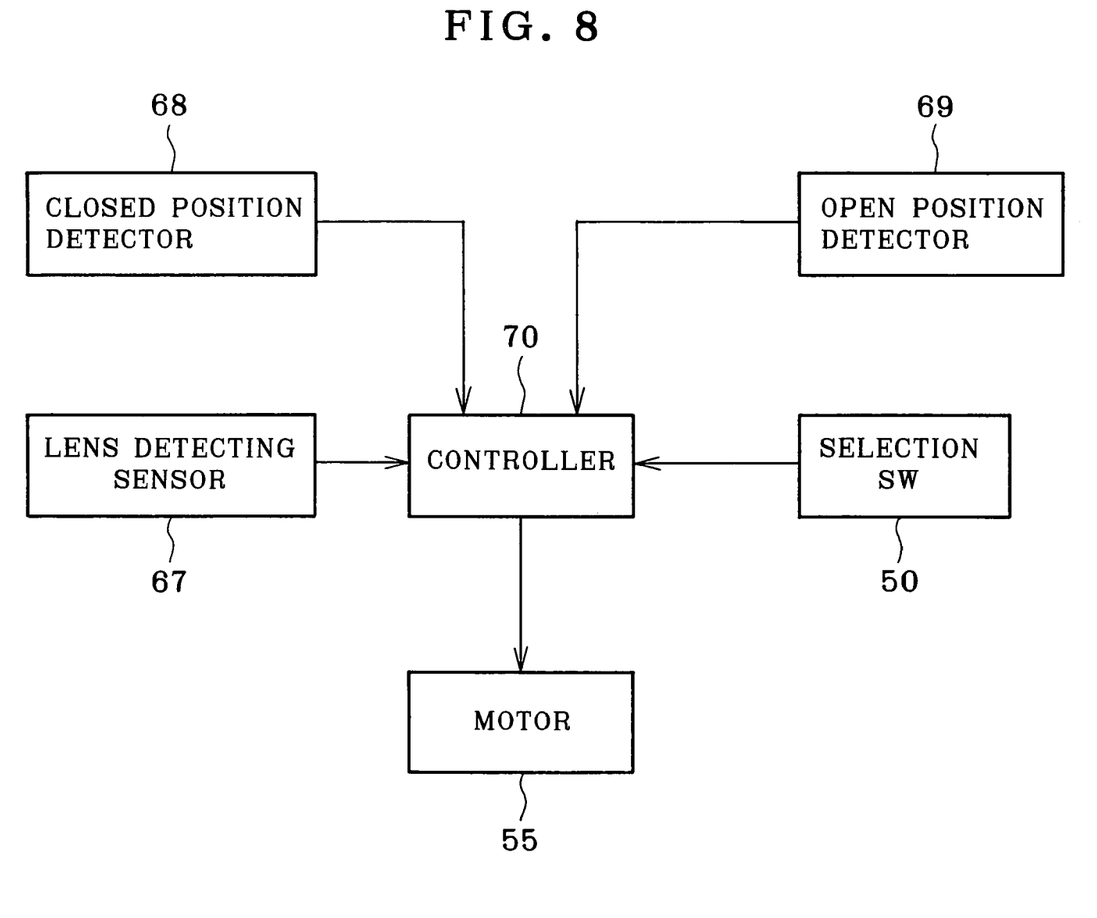
FIG. 8 is a block diagram schematically illustrating a motor and other circuits for moving the protection cover.

Operation of circuits in shifting the protection cover 31 in the closed and open positions is described. In FIG. 8, a controller 70 controls elements in the digital still camera 2. Various circuits are connected to the controller 70, including the selection switch 50, the motor 55, the lens detecting sensor 67, the closed position detector 68 and the open position detector 69.

Upon the selective setting of the automatic mode, the controller 70 controls various elements according to an automatic mode program. The selection switch 50 is set in a selected one of the open and closed positions, so the controller 70 drives the motor 55. The controller 70, if the selection switch 50 is set for the open position, shifts the protection cover 31 to the open position, and if the selection switch 50 is set for the closed position, shifts the protection cover 31 to the closed position. Note that the motor 55 is inactive if the protection cover 31 is in the open position after selective setting of opening the protection cover 31. Also, the motor 55 is inactive if the protection cover 31 is in the closed position after selective setting of closing the protection cover 31.

When the bayonet claw portion 12 is shifted from the insertion position of FIG. 6 to the lock position of FIG. 7, the lens detecting sensor 67 detects the bayonet claw portion 12, and sends a detection signal to the controller 70. The controller 70 evaluates the output of the lens detecting sensor 67, and determines that the lens unit 6 is fitted on the camera body 5 in response to the detection signal.

In FIG. 6, when the protection cover 31 is in the closed position, the closed position detector 68 detects the fastener 61, and sends a first detection signal to the controller 70. The controller 70 responsive to the first detection signal detects that the protection cover 31 is in the closed position.

In FIG. 7, when the protection cover 31 is in the open position, the open position detector 69 detects the fastener 61, and sends a second detection signal to the controller 70. The controller 70 responsive to the second detection signal detects that the protection cover 31 is in the open position.

The motor 55 is controlled by the controller 70. The motor 55 rotates the motor gear 65 in the direction of the arrow A of FIG. 6, to shift the protection cover 31 from the closed position to the open position. Also, the motor 55 rotates the motor gear 65 in the direction of the arrow B of FIG. 7, to shift the protection cover 31 to the closed position.

In operation, the selection switch 50 is set for the automatic mode. This is for the use of the digital still camera 2. See FIG. 5. While the lens unit 6 is separate from the camera body 5, the protection cover 31 closes the exposure opening 25. The controller 70 receives a first detection signal from the closed position detector 68.

When the bayonet claw portion 12 shifts from the insertion position to the lock position by fitting the lens unit 6 on the camera body 5, the lens detecting sensor 67 detects the bayonet claw portion 12 to send a detection signal to the controller 70. The lens unit 6 is found fitted on the camera body 5 by the controller 70, which drives the motor 55.

The controller 70 causes the motor 55 to rotate in the direction of the arrow A in FIG. 6. The endless belt or timing belt 53 causes the fastener 60 to move up the upper protection cover panel 32, and causes the fastener 61 to move down the lower protection cover panel 33. When the protection cover panels 32 and 33 shift to the open position, the open position detector 69 detects the fastener 61, to send a second detection signal to the controller 70. The controller 70 stops the motor 55 upon receipt of the second detection signal. Thus, entry of dust into the camera body 5 is avoided during exchange of the lens unit 6, because the protection cover 31 shifts to the open position only after fitting the lens unit 6 on the camera body 5.

When the lens unit 6, to be removed from the camera body 5, is rotated in the counterclockwise direction, then the bayonet claw portion 12 moves from the locking position to the insertion position. There is no detection of the lens detecting sensor 67 for the bayonet claw portion 12. No detection signal is input to the controller 70. Thus, the lens unit 6 is found removed from the camera body 5 by the controller 70, which controls the motor 55.

The controller 70 causes the motor 55 to rotate in the direction of the arrow B in FIG. 7. The endless belt or timing belt 53 moves down the upper protection cover panel 32, and moves up the lower protection cover panel 33. When the protection cover panels 32 and 33 shift to the closed position, the open position detector 69 detects the fastener 61, to send a first detection signal to the controller 70. The controller 70 stops the motor 55 upon receipt of the first detection signal. Thus, entry of dust into the camera body 5 is avoided during exchange of the lens unit 6, because the protection cover 31 shifts to the closed position shortly before removing the lens unit 6 from the camera body 5.

The use of the selection switch 50 is specifically effective in the maintenance of the camera body 5. When the manual mode is set by use of the selection switch 50, the protection cover 31 can be intentionally set in the open position. Accordingly, the handling of the digital still camera 2 can be easy.

In the present embodiment, the timing belts 53 are two belts on the right and left sides. However, only one timing belt in connection with the motor 55 can be used on the right side in the drawing. On the left side, a mechanism for supporting the protection cover panels 32 and 33 may be a free timing belt turnable in a separate manner from the motor 55, a friction belt with pulleys without teeth, or the like.

Figure 9:
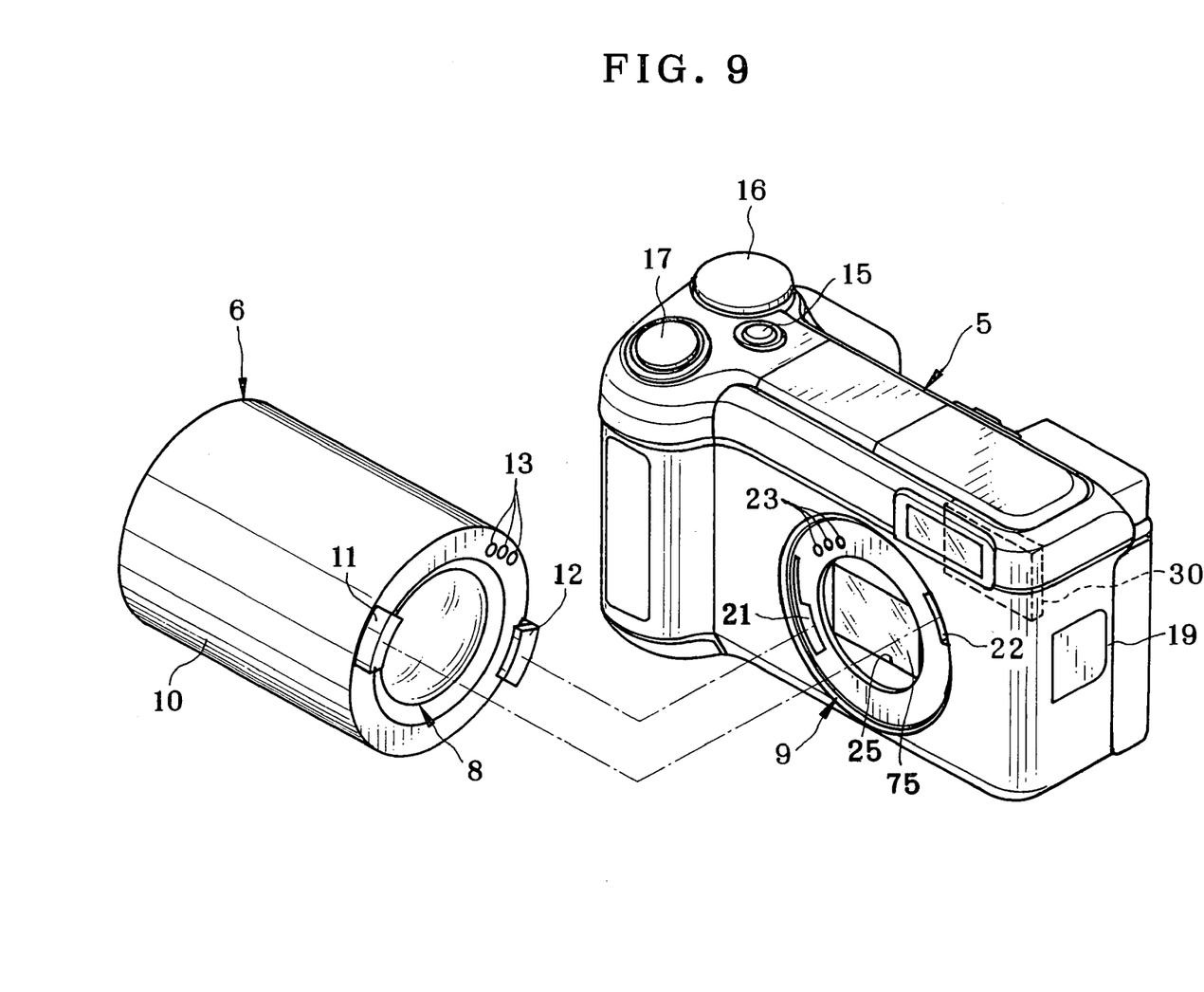
FIG. 9 is a perspective view illustrating another preferred digital still camera having a transparent protection cover.

In FIG. 9, another preferred camera is illustrated, in which a transparent protection cover 75 is stationary, and closes the exposure opening 25.

Examples of materials for the transparent protection cover 75 and glass, resin and other transparent substances. The protection cover 75 is fitted in the exposure opening 25 from the inside of the camera body 5 and kept fixed. Thus, the inside of the camera body 5 is kept enclosed. The protection cover 75 also has a sufficient thickness for preventing flexing or damage even when pressure is applied to the protection cover 75 from the side of the lens unit 6. Dust is prevented from entry in the exposure opening 25 while the lens unit 6 is removed from the camera body 5.

As the transparent protection cover 75 closes the lens mount of the camera body 5 hermetically, entry of droplets of water or other material can be prevented during exchange of the lens unit 6. If dust deposits on the surface of the protection cover 75, it is possible to eliminate the dust by blowing compressed gas, wiping with a brush, or the like.

Unlike the transparent protection cover 75 directly fitted in the exposure opening 25, it is possible to fit the protection cover 75 on the inside or outside of the exposure opening 25. Note that the protection cover 75 is so positioned as to ensure the connection of the electrical contacts 23 on the mount mechanism 9 with the electrical contacts 13 on the bayonet mount 8.

In the above embodiments, the protection cover panels 32 and 33 are vertically movable. However, the protection cover 31 can be constructed in various modified manners. For example, panels of the protection cover 31 may be movable horizontally in opposite directions. Also, a plurality of blades may constitute the protection cover 31, and may shift toward and away from the center of the exposure opening 25 in the manner similar to a mechanical shutter of a multi blade type.

Although the camera of the above embodiments is a digital still camera, a camera of the invention may be a camera for use with photo film as silver halide photosensitive material.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens interchangeable camera comprising:
   a camera body;
   a lens unit retained on said camera body in a removable manner;
   a protection cover, secured to said camera body, and movable between a closed position and an open position, wherein said protection cover, when in said closed position, closes an exposure opening formed for entry of object light from said lens unit into said camera body, and when in said open position, opens said exposure opening;
   a cover moving mechanism for setting said protection cover in said open position when said lens unit is retained on said camera body, and for setting said protection cover in said closed position when said lens unit is removed from said camera body; and
   a lens detecting sensor for detecting retention of said lens unit on said camera body;
   wherein said cover moving mechanism is actuated according to a detection result of said lens detecting sensor, sets said protection cover in said open position when said retention is detected, and sets said protection cover in said closed position in case of lack of detected retention.

2. A lens interchangeable camera as defined in claim 1, further comprising a retaining mechanism for engaging said lens unit with said camera body;
   said cover moving mechanism includes a transmission member, actuated in response to movement of said retaining mechanism, for moving said protection cover to said open position.

3. A lens interchangeable camera as defined in claim 2, further comprising:
   a support mechanism for keeping said protection cover movable between said closed and open positions; and
   a biasing mechanism for biasing said protection cover toward said closed position.

4. A lens interchangeable camera as defined in claim 3, wherein said retaining mechanism includes:
   a bayonet channel formed in said camera body;
   a bayonet claw portion, disposed to project from said lens unit, for engagement with said bayonet channel;
   said transmission member includes first and second ends, said first end is secured to said protection cover, and said second end is pressed by said bayonet claw portion.

5. A lens interchangeable camera as defined in claim 4, wherein said bayonet claw portion is constituted by at least first and second bayonet claw portions disposed in a rotationally symmetric manner with one another;
   said protection cover is constituted by at least first and second protection cover panels for moving together from said closed position to close said exposure opening to said open position away from a position of said exposure opening;
   said transmission member is constituted by first and second transmission members;
   said first protection cover panel is moved in a predetermined direction by said first bayonet claw portion with said first transmission member;
   said second protection cover panel is moved in reverse to said predetermined direction by said second bayonet claw portion with said second transmission member.

6. A lens interchangeable camera as defined in claim 1, further comprising a selection switch shiftable selectively in a manual mode position and an automatic mode position;
   wherein said selection switch, when set in said manual mode position, causes said cover moving mechanism to set said protection cover in either of said closed and open positions irrespective of said detection result of said lens detecting sensor, and when said set in said automatic mode position, operates said cover moving mechanism according to said detection result of said lens detecting sensor.

7. A lens interchangeable camera as defined in claim 6, wherein said manual mode position is constituted by first and second positions, and said selection switch, when in said first position, sets said protection cover in said closed position, and when in said second position, sets said protection cover in said open position.

8. A lens interchangeable camera as defined in claim 6, wherein said cover moving mechanism further includes:
   an endless belt having said protection cover secured thereto;
   first and second pulleys which said endless belt is engaged with to extend between; and
   a motor for rotating said first pulley to move said protection cover by turning about said endless belt.

9. A lens interchangeable camera as defined in claim 8, wherein said protection cover is constituted by first and second protection cover panels disposed adjacent to one another;
   said endless belt includes:
   a first belt portion, disposed to extend between said first and second pulleys, for sliding said first protection cover panel in a predetermined direction;
   a second belt portion, disposed to extend along said first belt portion to extend, for sliding said second protection cover panel in reverse to said predetermined direction.

10. A lens interchangeable camera as defined in claim 9, wherein said cover moving mechanism further includes at least one transmission gear for transmitting rotation of said motor to said first pulley;
said endless belt is a timing belt, and said first and second pulleys are timing pulleys.

11. A lens interchangeable camera as defined in claim 9, further comprising:
   a second endless belt, disposed opposite to said endless belt with reference to said exposure opening, for supporting ends of said first and second protection cover panels movably;
   third and fourth pulleys which said second endless belt is engaged with to extend between.

12. A lens interchangeable camera as defined in claim 7, further comprising a bayonet type of retaining mechanism for engaging said lens unit with said camera body.

13. A lens interchangeable camera comprising:
   a camera body;
   a lens unit retained on said camera body in a removable manner;
   a protection cover, secured to said camera body, and movable between a closed position and an open position, wherein said protection cover, when in said closed position, closes an exposure opening formed for entry of object light from said lens unit into said camera body, and when in said open position, opens said exposure opening;
   a lens detecting sensor for detecting retention of said lens unit on said camera body; and
   a cover moving mechanism for setting said protection cover in said open position when said retention is detected by said lens detecting sensor, and for setting said protection cover in said closed position in case of lack of retention detected by said lens detecting sensor.

* * * * *